United States Patent
Zhong et al.

(10) Patent No.: US 11,640,219 B2
(45) Date of Patent: May 2, 2023

(54) TOUCH ELEMENT, TOUCH SUBSTRATE, DISPLAY DEVICE AND METHOD OF MANUFACTURING TOUCH SUBSTRATE

(71) Applicants: Hefei Xinsheng Optoelectronics Technology Co., Ltd., Anhui (CN); BOE Technology Group Co., Ltd., Beijing (CN)

(72) Inventors: Tengfei Zhong, Beijing (CN); Xiaodong Xie, Beijing (CN); Min He, Beijing (CN); Shifeng Xu, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 239 days.

(21) Appl. No.: 16/611,543

(22) PCT Filed: Jan. 28, 2019

(86) PCT No.: PCT/CN2019/073304
§ 371 (c)(1),
(2) Date: Nov. 7, 2019

(87) PCT Pub. No.: WO2019/179241
PCT Pub. Date: Sep. 26, 2019

(65) Prior Publication Data
US 2021/0149523 A1 May 20, 2021

(30) Foreign Application Priority Data
Mar. 23, 2018 (CN) .......................... 201810243495.9

(51) Int. Cl.
*G06F 3/044* (2006.01)

(52) U.S. Cl.
CPC .......... *G06F 3/0445* (2019.05); *G06F 3/0446* (2019.05); *G06F 3/0448* (2019.05);
(Continued)

(58) Field of Classification Search
CPC ............. G06F 3/044–0448; G06F 2203/04112
See application file for complete search history.

(56) References Cited

U.S. PATENT DOCUMENTS 8,859,911 B2 * 10/2014 Hwang .................... G06F 3/041
174/257
9,055,680 B2 * 6/2015 Nakamura .............. B32B 15/14
(Continued)

FOREIGN PATENT DOCUMENTS

| CN | 104885042 A | 9/2015 |
|---|---|---|
| CN | 105353931 A | 2/2016 |

(Continued)

OTHER PUBLICATIONS

First Office Action and English language translation, CN Application No. 201810243495.9, dated Apr. 1, 2020, 21 pp.

*Primary Examiner* — Patrick F Marinelli
(74) *Attorney, Agent, or Firm* — Myers Bigel, P.A.

(57) ABSTRACT

A touch element, a touch substrate, a display device, and a method of manufacturing the touch substrate are disclosed. The touch element includes a first conductive pattern layer. The first conductive pattern layer includes a first conductive pattern. The first conductive pattern includes a first basic pattern and a first incremental pattern. The touch element further includes a second conductive pattern layer. The second conductive pattern layer is stacked with and insulated from the first conductive pattern layer. An orthographic projection of the first incremental pattern on the second conductive pattern layer coincides with a pattern of the second conductive pattern layer.

19 Claims, 5 Drawing Sheets

(52) U.S. Cl.
CPC .............. *G06F 2203/04103* (2013.01); *G06F 2203/04112* (2013.01)

(56) References Cited

U.S. PATENT DOCUMENTS

| | | | |
|---|---|---|---|
| 9,078,364 B2* | 7/2015 | Nakamura | B32B 15/14 |
| 9,851,850 B2* | 12/2017 | Kim | G06F 3/0446 |
| 9,910,550 B2* | 3/2018 | Kim | G06F 3/0445 |
| 10,437,405 B2* | 10/2019 | Chen | G06F 3/0443 |
| 10,606,383 B2* | 3/2020 | Choi | G06F 1/1692 |
| 10,936,133 B2* | 3/2021 | Nakayama | G06F 3/0445 |
| 2010/0044122 A1* | 2/2010 | Sleeman | G06F 3/041661 178/18.06 |
| 2010/0302201 A1* | 12/2010 | Ritter | G06F 3/0446 345/174 |
| 2014/0092323 A1* | 4/2014 | Hwang | G06F 3/041 349/12 |
| 2014/0168543 A1* | 6/2014 | Hwang | G06F 3/041 349/12 |
| 2014/0231120 A1* | 8/2014 | Nakamura | H05K 1/0274 174/253 |
| 2014/0238730 A1* | 8/2014 | Nakamura | G06F 3/041 174/253 |
| 2014/0299361 A1* | 10/2014 | Nakamura | H05K 1/0296 174/253 |
| 2015/0212537 A1* | 7/2015 | Cok | G06F 3/042 345/174 |
| 2015/0212613 A1* | 7/2015 | Fowlkes | H05K 1/0216 345/173 |
| 2015/0227238 A1* | 8/2015 | Kim | G06F 3/0446 345/174 |
| 2015/0242010 A1* | 8/2015 | Cok | G06F 3/046 345/174 |
| 2015/0331538 A1* | 11/2015 | Hashida | G06F 3/0446 345/174 |
| 2016/0048248 A1 | 2/2016 | Na et al. | |
| 2016/0070406 A1 | 3/2016 | Han et al. | |
| 2016/0209971 A1 | 7/2016 | Kim et al. | |
| 2016/0224181 A1* | 8/2016 | Kim | G06F 3/0445 |
| 2017/0031490 A1* | 2/2017 | Hashida | G02F 1/134309 |
| 2017/0285806 A1 | 10/2017 | Xie et al. | |
| 2018/0018034 A1* | 1/2018 | Choi | G06F 3/041 |
| 2018/0018042 A1* | 1/2018 | Shiojiri | G06F 3/0445 |
| 2018/0113345 A1 | 4/2018 | Song et al. | |
| 2018/0173346 A1* | 6/2018 | Du | H01L 27/124 |
| 2019/0095020 A1 | 3/2019 | Wu et al. | |
| 2019/0129568 A1* | 5/2019 | Sakamoto | G06F 3/047 |
| 2019/0187825 A1* | 6/2019 | Chen | G06F 3/0448 |
| 2019/0187846 A1* | 6/2019 | Du | G06F 3/0412 |
| 2019/0227651 A1* | 7/2019 | Kato | G06F 3/0446 |
| 2020/0117295 A1* | 4/2020 | Nakayama | H05K 3/0014 |
| 2020/0192504 A1* | 6/2020 | Nakamura | G06F 3/0445 |
| 2020/0285348 A1* | 9/2020 | Nakayama | G06F 3/0446 |

FOREIGN PATENT DOCUMENTS

| | | |
|---|---|---|
| CN | 105373251 A | 3/2016 |
| CN | 105404408 A | 3/2016 |
| CN | 106055141 A | 10/2016 |
| CN | 106502454 A | 3/2017 |
| CN | 106681561 A | 5/2017 |
| CN | 107533410 A | 1/2018 |
| CN | 107678588 A | 2/2018 |
| JP | 2009301767 A * | 12/2009 |
| JP | 2012079238 A * | 4/2012 |

* cited by examiner

TOUCH ELEMENT, TOUCH SUBSTRATE, DISPLAY DEVICE AND METHOD OF MANUFACTURING TOUCH SUBSTRATE

CROSS REFERENCE TO RELATED APPLICATIONS

The present application is a 35 U.S.C. 371 national stage application of PCT international Application No. PCT/CN2019/073304 filed on Jan. 28, 2019, which claims the benefit of Chinese Patent Application No. 201810243495.9, filed on Mar. 23, 2018, the content of which is contents of which are incorporated herein by reference in its entirety their entireties.

FIELD

The present disclosure relates to the field of touch technologies, and in particular, to a touch element, a touch substrate, a display device, and a method of manufacturing a touch substrate.

BACKGROUND

In the field of touch screens, it is desired that the signal transmission speed of the touch screen can be increased. One important method for that is effectively reducing the channel impedance. However, reducing the channel impedance may aggravate the problem of Moire pattern.

SUMMARY

According to an aspect of the present disclosure, there is provided a touch element. The touch element comprises a first conductive pattern layer and a second conductive pattern layer. The first conductive pattern layer comprises a first conductive pattern, and the first conductive pattern comprises a first basic pattern and a first incremental pattern. The second conductive pattern layer is stacked with and insulated from the first conductive pattern layer. An orthographic projection of the first incremental pattern on the second conductive pattern layer coincides with a pattern of the second conductive pattern layer.

In some embodiments, the second conductive pattern layer comprises a second conductive pattern, and an orthographic projection of the first incremental pattern on the second conductive pattern layer overlaps with a portion of the second conductive pattern.

In some embodiments, an orthographic projection of the first conductive pattern layer without the first incremental pattern on the second conductive pattern layer interlaces with the pattern of the second conductive pattern layer.

In some embodiments, a combination comprising the pattern of the second conductive pattern layer and an orthographic projection of the first conductive pattern layer on the second conductive pattern layer is periodically distributed.

In some embodiments, the first incremental pattern is a mesh.

In some embodiments, the second conductive pattern comprises a second basic pattern and a second incremental pattern, and an orthographic projection of the second incremental pattern on the first conductive pattern layer coincides with a pattern of the first conductive pattern layer.

In some embodiments, the orthographic projection of the second incremental pattern on the first conductive pattern layer overlaps with a portion of the first conductive pattern.

In some embodiments, the second incremental pattern is a mesh.

In some embodiments, a pattern of the first conductive pattern layer is the same as the pattern of the second conductive pattern layer.

In some embodiments, the first conductive pattern is configured to be a touch driving electrode, and the second conductive pattern is configured to be a touch sensing electrode.

According to another aspect of the present disclosure, there is provided a touch substrate. The touch substrate comprises a base and a touch element according to an embodiment of the present disclosure on the base.

In some embodiments, the touch substrate further comprises an insulating layer, wherein the insulating layer is between the first conductive pattern layer and the second conductive pattern layer.

In some embodiments, the touch substrate further comprises a light shielding layer and an overcoat layer, wherein the light shielding layer, the overcoat layer and the second conductive pattern layer are sequentially disposed in a direction away from the base.

According to yet another aspect of the present disclosure, there is provided a display device. The display device comprises a touch substrate according to an embodiment of the present disclosure.

According to still another aspect of the present disclosure, there is provided a method of manufacturing a touch substrate. The method comprises forming a second conductive pattern layer, and forming a first conductive pattern layer above the second conductive pattern layer. The first conductive pattern layer comprises a first conductive pattern, the first conductive pattern comprises a first basic pattern and a first incremental pattern, and an orthographic projection of the first incremental pattern on the second conductive pattern layer coincides with a pattern of the second conductive pattern layer.

In some embodiments, the step of forming the first conductive pattern layer above the second conductive pattern layer comprises: forming the first basic pattern and the first incremental pattern by one patterning process.

In some embodiments, the second conductive pattern layer comprises a second conductive pattern, the second conductive pattern comprises a second basic pattern and a second incremental pattern, and an orthographic projection of the second incremental pattern on the first conductive pattern layer coincides with a pattern of the first conductive pattern layer. The step of forming the second conductive pattern layer comprises: forming the second basic pattern and the second incremental pattern by one patterning process.

In some embodiments, the method further comprises forming a light shielding layer on a base, and forming an overcoat layer on a side of the light shielding layer away from the base. The step of forming a second conductive pattern layer comprises: forming the second conductive pattern layer on a side of the overcoat layer away from the base.

In some embodiments, the method further comprises forming an insulating layer on a side of the second conductive pattern layer away from the base, and the step of forming the first conductive pattern layer above the second conductive pattern layer comprises forming the first conductive pattern layer on a side of the insulating layer away from the base.

BRIEF DESCRIPTION OF THE DRAWINGS

Embodiments of the present disclosure are described in more detail and by way of non-limiting example with reference to the accompanying drawings. It should be noted that the drawings are not necessarily drawn to scale. In the drawings.

DETAILED DESCRIPTION OF EMBODIMENTS

In order to make the objects, the technical solutions and the effects of the present disclosure more clear, the present disclosure will be further described in detail below in conjunction with specific embodiments and with reference to the accompanying drawings.

Currently, a conductive pattern such as a metal mesh is commonly used in the touch screen. It has a very fast signal transmission speed, so it can significantly reduce the RC delay, such that its signal transmission speed can be several times to several tens of times of the signal transmission speed of the ordinary indium tin oxide (ITO) touch screen. In order to further increase the signal transmission speed of the touch screen, one way is to reduce the channel impedance. Related ways to reduce channel impedance comprise, for example, increasing the metal wire density, the metal wire width, and the metal wire thickness of the metal mesh. However, the metal mesh may produce Moire Pattern, and the way of increasing the wire density to reduce channel impedance will aggravate the Moire Pattern problem. In addition, the ways of increasing the metal wire width and the metal wire thickness will significantly increase the problem of the smear and increase the manufacturing cost, and therefore increase the burden of shadow elimination. Another possible way is to manufacture the metal wires by using the materials with lower resistance, but the current processing capability is not fully developed.

Figure 1:
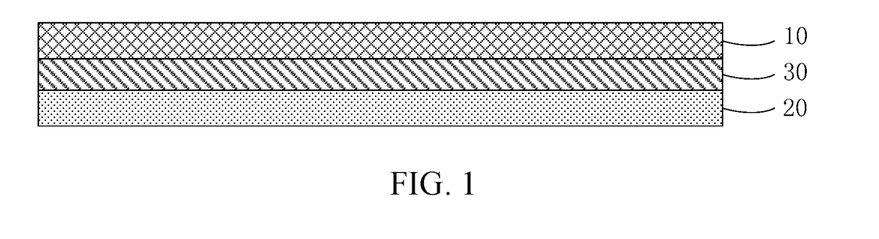
FIG. 1 schematically illustrates a cross-sectional view of a touch element in accordance with an embodiment of the present disclosure.
Figure 2:
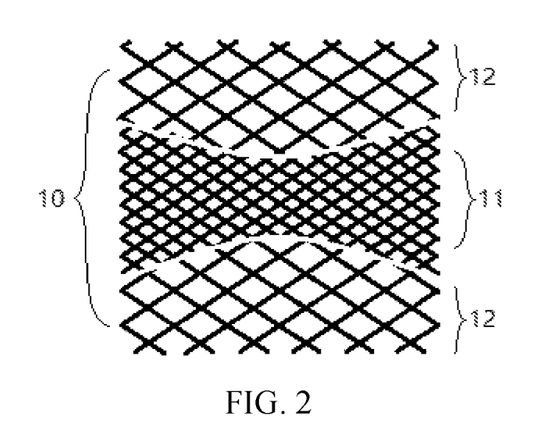
FIG. 2 schematically illustrates a top view of a first conductive pattern layer of a touch element in accordance with an embodiment of the present disclosure.
Figure 3:
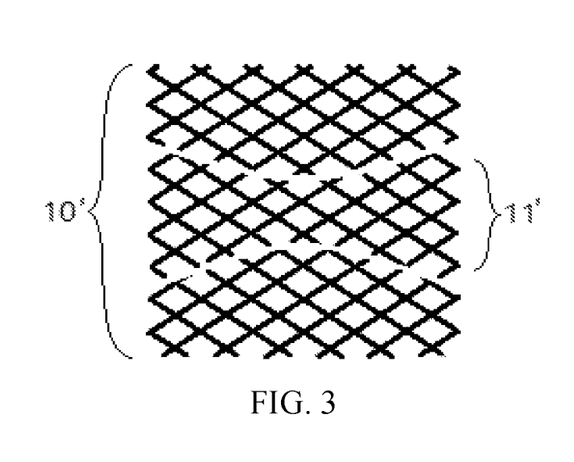
FIG. 3 schematically illustrates a top view of a first conductive pattern layer of a touch element in accordance with an embodiment of the present disclosure, with a first incremental pattern being removed.
Figure 4:
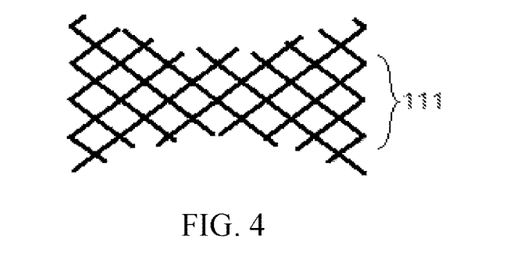
FIG. 4 schematically illustrates a top view of a first incremental pattern of a touch element in accordance with an embodiment of the present disclosure.
Figure 5:
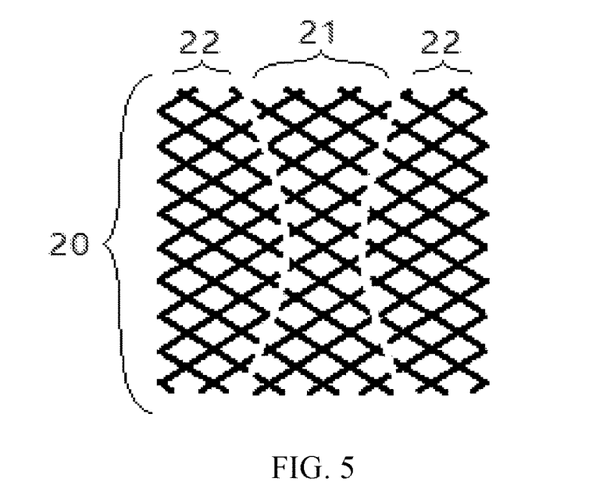
FIG. 5 schematically illustrates a top view of a second conductive pattern layer of a touch element in accordance with an embodiment of the present disclosure.
Figure 6:
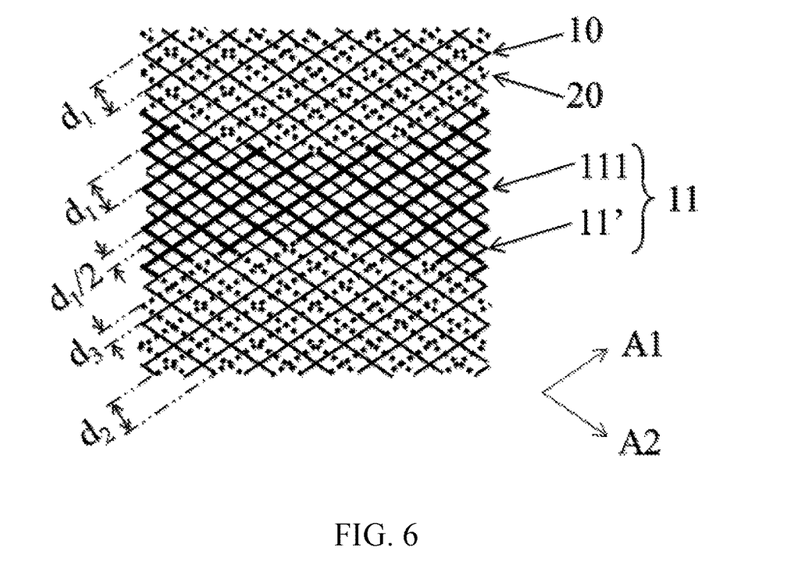
FIG. 6 schematically illustrates a top view of a touch element in accordance with an embodiment of the present disclosure.

According to an aspect of the present disclosure, a touch element is provided. FIG. 1 schematically illustrates a cross-sectional view of a touch element in accordance with an embodiment of the present disclosure. FIG. 2 schematically illustrates a top view of a first conductive pattern layer of a touch element in accordance with an embodiment of the present disclosure. FIG. 3 schematically illustrates a top view of a first conductive pattern layer of a touch element in accordance with an embodiment of the present disclosure, with a first incremental pattern being removed. FIG. 4 schematically illustrates a top view of a first incremental pattern of a first conductive pattern of a touch element in accordance with an embodiment of the present disclosure. FIG. 5 schematically illustrates a top view of a second conductive pattern layer of a touch element in accordance with an embodiment of the present disclosure. FIG. 6 schematically illustrates a top view of a touch element in accordance with an embodiment of the present disclosure.

The touch element comprises a first conductive pattern layer 10 and a second conductive pattern layer 20. Each of the conductive pattern layers comprises a pattern and a hollow. The location of the hollow is not provided with any pattern. The first conductive pattern layer 10 comprises a first conductive pattern 11. The first conductive pattern 11 comprises a first basic pattern 11' and a first incremental pattern 111. The second conductive pattern layer 20 is stacked with and insulated from the first conductive pattern layer 10. An orthographic projection of the first incremental pattern 111 on the second conductive pattern layer 20 coincides with the pattern of the second conductive pattern layer 20. That is, the orthographic projection of the first incremental pattern 111 on the second conductive pattern layer 20 is casted only on the pattern of the second conductive pattern layer 20, and not casted on the location of the hollow.

The above feature can also be understood as follows: on a reference plane parallel to the first conductive pattern layer 10 and the second conductive pattern layer 20, for example on a plane where a base of the touch substrate comprising the touch element is located, the orthographic projection of the first incremental pattern 111 is within the orthographic projection of the pattern of the second conductive pattern layer (e.g., the orthographic projection of the first incremental pattern 111 coincides with the orthographic projection of the pattern of the second conductive pattern layer). That is, in a direction perpendicular to the base, the first incremental pattern 111 is facing the pattern of the second conductive pattern layer 20. The first conductive pattern 11 can be regarded as being formed by forming the first incremental pattern 111 on the first basic pattern 11'. When the first incremental pattern is not provided, the effective conductive channel is composed only of the first basic pattern 11'. In the embodiment of the present disclosure, the effective conductive channel comprises the first basic pattern and the first incremental pattern. FIG. 6 schematically shows the superposition effect of the first conductive pattern layer and the second conductive pattern layer. In FIG. 6, the solid lines indicate the first conductive pattern layer 10, and the broken lines indicate the second conductive pattern layer. More specifically, the thick solid lines indicate the first incremental pattern 111, and the thin solid lines indicate the remaining portion 10' of the first conductive pattern layer 10, i.e., the pattern of the first conductive pattern layer 10 without the first incremental pattern 111. As can be seen from FIG. 6, the orthographic projection of the first incremental pattern 111 on the second conductive pattern layer 20 is directly on the pattern of the second conductive pattern layer 20, such that the visual effect of the superposition of the first conductive pattern layer 10 and the second conductive pattern layer 20 will not be affected by the first incremental pattern. Therefore, although the wiring density of the first conductive pattern layer is increased, the wiring density of the combination of the orthographic projections of the first conductive pattern layer 10 and the second conductive pattern layer 20 on the plane of the first conductive pattern layer 10 or the second conductive pattern layer 20 is not increased because the added first incremental pattern is directly facing the pattern of the second conductive pattern layer. In this way, by using the first incremental pattern 111, the effective width of the channel of the first conductive pattern is increased, the channel impedance is reduced and the electrical performance of the touch element is improved without increasing the Moire Pattern.

The patterns of the first conductive pattern layer 10 and the second conductive pattern layer 20 may be, but are not limited to, meshes. Similarly, the pattern of the first incremental pattern 111 may be, but are not limited to a mesh. It may also be other shapes, for example, a parallel line group consisting of a plurality of parallel lines, as long as it can be ensured that the orthographic projection of the first incremental pattern 111 on the second conductive pattern layer 20 overlaps with the pattern of the second conductive pattern layer 20 while increasing the effective width of the channel.

The first conductive pattern layer 10 may further comprise a first dummy pattern 12 that is configured to not transmit a signal, in addition to the first conductive pattern 11. Similarly, the second conductive pattern layer 20 may comprise a second dummy pattern 22 configured to not transmit a signal, in addition to the second conductive pattern 21. The first dummy pattern 12 is electrically insulated from the first conductive pattern 11. The second dummy pattern 22 is electrically insulated from the second conductive pattern 21. In order to prevent the dummy pattern from being in electrical connection with the conductive pattern, the pattern between the dummy pattern and the conductive pattern may be removed by a process such as etching. Specifically, a slit can be formed between the conductive pattern and the dummy pattern by etch. For example, as shown in FIG. 2 and FIG. 5, there is a dummy boundary between the dummy pattern and the conductive pattern. Due to the existence of the dummy boundary, the orthographic projection of the first incremental pattern 111 on the second conductive pattern layer may have a very small portion falling at the dummy boundary of the second conductive pattern layer. Since this portion of orthographic projection is very small, the existence of the dummy boundary substantially does not affect the expression that "the orthographic projection of the first incremental pattern on the second conductive pattern layer coincides with the pattern of the second conductive pattern layer". That is, as long as the orthographic projection of the first incremental pattern 111 on the second conductive pattern layer substantially coincides with the pattern of the second conductive pattern layer, it is within the disclosure scope of the present application. In the same way, other similar expressions in the present disclosure may also be understood with reference to this, and will not be repeated.

In some embodiments, the first conductive pattern 11 and the second conductive pattern 21 have the same shape.

In some embodiments, the second conductive pattern layer 20 is placed below the first conductive pattern layer 10. However, the positions of the first conductive pattern layer 10 and the second conductive pattern layer 20 in the touch element are exchangeable, that is, the second conductive pattern layer 20 could be placed over the first conductive pattern layer 10. This exchange does not affect the normal operation of the touch element. When the first conductive pattern layer 10 is below the second conductive pattern layer 20, the first incremental pattern 111 is also below the second conductive pattern layer 20, that is, the position of the first incremental pattern 111 can also be upper or lower.

In addition, the applications of the first conductive pattern 11 and the second conductive pattern 21 may also be not limited. For example, in some embodiments, the first conductive pattern 11 is used as a touch driving electrode (Tx), and the second conductive pattern 21 is used as a touch sensing electrode (Rx). In another embodiment, the first conductive pattern 11 is used as a touch sensing electrode (Rx), and the second conductive pattern 21 is used as a touch driving electrode (Tx). Both applications do not affect the normal operation of the touch element.

In a case where the first conductive pattern 11 is a touch driving electrode and the second conductive pattern 21 is a touch sensing electrode, the first incremental pattern 111 is present in the touch driving electrode. In this way, the effective width of the conductive channel of the touch driving electrode can be increased to improve the electrical performance of the touch element.

FIG. 6 schematically illustrates a top view of the stacked first conductive pattern layer and second conductive pattern layer. In some embodiments, referring to FIG. 6, the orthographic projection of the first conductive pattern layer without the first incremental pattern on the second conductive pattern layer interlaces with the pattern of the second conductive pattern layer, which does not have an incremental pattern, e.g., the second conductive pattern layer only has the basic pattern. The term "interlace" can be understood as intersecting but being staggered. Specifically, the orthographic projection of the portion of the first conductive pattern layer which does not include the first incremental pattern on the second conductive pattern layer substantially does not coincide with the pattern of the second conductive pattern layer, which does not include an incremental pattern, but it is not excluded that an intersection between the orthographic projections of the first conductive pattern layer and the second conductive pattern layer exists. Therefore, the pattern density of the orthographic projection combination consisting of the orthographic projection of the first conductive pattern layer 10 on the base and the orthographic projection of the second conductive pattern layer 20 on the base is substantially double of the pattern density of the orthographic projection of a portion of the first conductive pattern layer 10 without the first incremental pattern 111 on the base. The term "pattern density" refers to a ratio of the area of the pattern (including the conductive pattern and the dummy pattern) to the area of the conductive pattern layer (including the wires and the hollows). In the case where the patterns of the first conductive pattern layer and the second conductive pattern layer are meshes, the pattern density may be the density of the mesh. It should be noted that the density of the mesh here can be interpreted as the number of wires in a unit area. Doubling the pattern density means that the pattern of the first conductive pattern layer 10 and the pattern of the second conductive pattern layer 20 are laminated with dislocation.

In some embodiments, referring to FIG. 6, a combination formed by the pattern of the second conductive pattern layer and the orthographic projection of the first conductive pattern layer on the second conductive pattern layer is periodically distributed. In other words, on a reference plane parallel to the first conductive pattern layer and the second conductive pattern layer, the orthographic projection combination formed by the orthographic projection of the first conductive pattern layer and the orthographic projection of the second conductive pattern layer is a periodically distributed graph. The term "periodically distributed" can be understood as that one pattern comprises several sub-patterns and that the spacing between these sub-patterns in one or more direction is the same. For example, in the example of FIG. 6, the pattern is a rhombus mesh. The sub-pattern of the rhombus mesh pattern may comprise a plurality of parallel lines extending in a first direction A1 and a plurality of parallel lines extending in a second direction A2. In this case, in the pattern formed by the first basic pattern 11' and the first dummy pattern 12 of the first conductive pattern layer 10, the parallel lines extending in the first direction A1 are equidistant parallel lines, and the spacing between two adjacent parallel lines is $d_1$. In the first incremental pattern 111, the parallel lines extending in the first direction A1 are also equidistant parallel lines, and the spacing between two adjacent parallel lines is also $d_1$. The first conductive pattern 11 comprises a first basic pattern 11' and the first incremental pattern 111. In the first conductive pattern 11, all parallel lines extending in the first direction A1 are equidistant parallel lines, and the spacing between two adjacent parallel lines is $d_1/2$. In the case where there is no incremental pattern in the second conductive pattern layer, the parallel lines extending in the first direction A1 in the second conductive pattern layer are equidistant parallel lines, and the spacing between two adjacent parallel lines is $d_2$. Within the meaning of "periodically distributed", $d_1=d_2$, and in the orthographic projection combination consisting of the orthographic projection of the first conductive pattern layer and the orthographic projection of the second conductive pattern layer, all parallel lines extending in the first direction A1 are equidistant parallel lines, with the spacing between two adjacent parallel lines $d_3$ follows the following equation: $d_3=d_1/2=d_2/2$. Although only the parallel lines extending in the first direction were discussed above, it should be understood that the parallel lines extending in the second direction have the similar characteristics. For the sake of brevity, it will not be repeated here. The combination formed by the orthographic projections of the first conductive pattern layer 10 and the second conductive pattern layer 20 on the base is evenly distributed, so that the distribution of the overall pattern of the touch element is relatively even, and the Moire Pattern caused by a uneven distribution is no longer easily formed.

In some embodiments, the first incremental pattern 111 is a mesh. The mesh shape of the first incremental pattern 111 is the same as the mesh shape of (the basic pattern of) the second conductive pattern layer 20. Thus, the mesh of the first conductive pattern 11 is evenly distributed, and the effective width of the conductive channel of the first conductive pattern layer is substantially doubled. Meanwhile, the first incremental pattern 111 can overlap exactly with the second conductive pattern layer, thereby not affecting the overall Moire Pattern effect.

Figure 7:
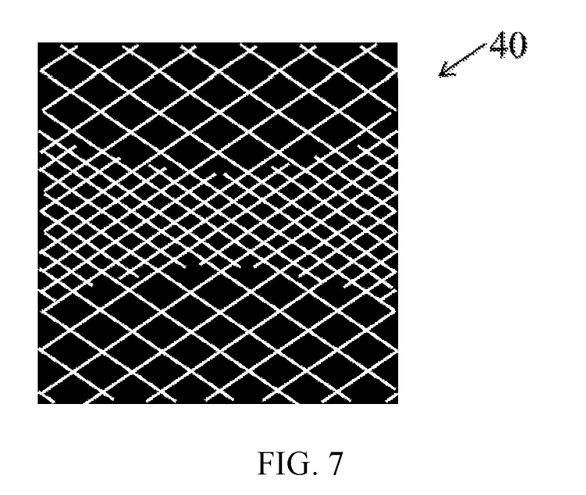
FIG. 7 schematically illustrates a top view of a mask for manufacturing a touch element in accordance with an embodiment of the present disclosure.

In some embodiments, the first conductive pattern layer 10 can be formed by one patterning process using a mask plate 40. The expression "one patterning process" means that the pattern of the conductive pattern layer can be formed by one exposure, one development, one etching, and one stripping of the one patterning process. FIG. 7 schematically shows the structure of the mask plate 40. This method can save the costs and improve the production efficiency.

Figure 8:
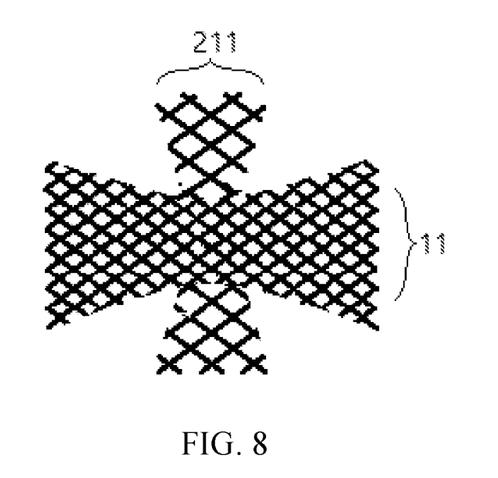
FIG. 8 schematically illustrates a top view of the stacked first conductive pattern and second conductive pattern of a touch element in accordance with an embodiment of the present disclosure.

FIG. 8 schematically shows the first conductive pattern and the second conductive pattern of the touch element in accordance with an embodiment of the present disclosure. As shown in FIG. 8, the first conductive pattern 11 and the second conductive pattern 21 are arranged to cross each other. In this case, the orthographic projection of the first incremental pattern on the second conductive pattern layer overlaps with a portion of the second conductive pattern. It should be noted that, the orthographic projection of the first incremental pattern 111 partially overlaps with the second conductive pattern 21, and the orthographic projection of the first incremental pattern 111 on the second conductive pattern layer is completely within the pattern of the second conductive pattern layer 20, i.e., the orthographic projection of the first incremental pattern 111 on the above mentioned reference plane is completely within the orthographic projection of the pattern of the second conductive pattern layer 20 on the reference plane.

Figure 9:
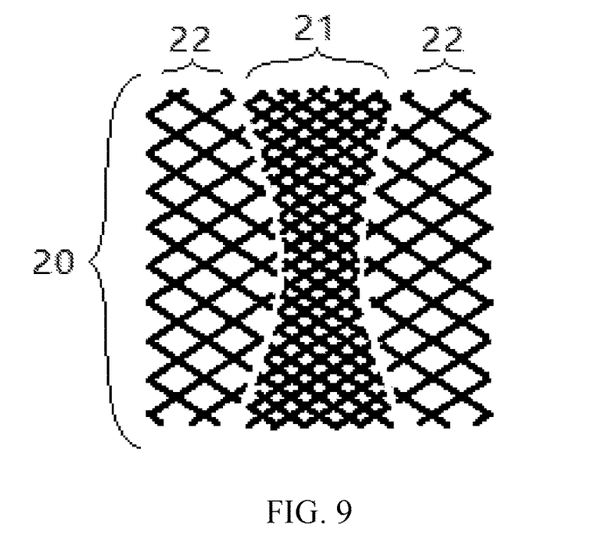
FIG. 9 schematically illustrates a top view of a second conductive pattern layer of a touch element in accordance with another embodiment of the present disclosure.
Figure 10:
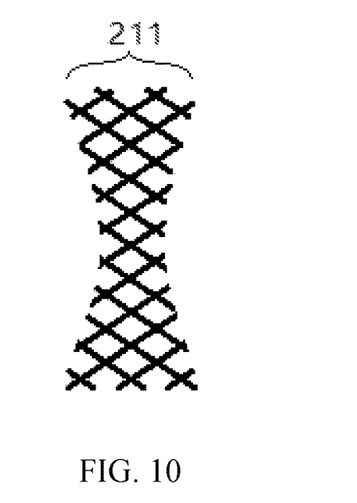
FIG. 10 schematically illustrates a top view of a second incremental pattern of a touch element in accordance with an embodiment of the present disclosure.

FIG. 9 schematically illustrates the structure of the second conductive pattern layer of the touch element in accordance with another embodiment of the present disclosure. The second conductive pattern layer comprises a second conductive pattern. Unlike the aforementioned second conductive pattern layer, which does not have an incremental pattern, the second conductive pattern 21 in this embodiment comprises a second basic pattern and a second incremental pattern 211. FIG. 10 schematically illustrates the second incremental pattern of the second conductive pattern of the touch element in accordance with the embodiment of the present disclosure. The orthographic projection of the second incremental pattern 211 on the first conductive pattern layer coincides with the pattern of the first conductive pattern layer 10. Thus, by providing the second incremental pattern 211 in the second conductive pattern 21 of the second conductive pattern layer 20, the effective width of the channel of the second conductive pattern 21 is further increased, thereby increasing the signal transmission speed of the second conductive pattern 21. Meanwhile, likewise, the second incremental pattern 211 does not affect the overall Moire Pattern effect.

The shape of the second incremental pattern 211 is not limited to a mesh shape. For example, it may also be another shape comprising, but not limited to, a parallel line group formed by a plurality of parallel lines, as long as it can overlap with the pattern of the first conductive pattern layer 10 while increasing the effective width of the channel.

When the first conductive pattern 11 and the second conductive pattern 21 are arranged with dislocation, a portion of the second incremental pattern 211 overlaps with a portion of the first conductive pattern 11, e.g., with the first basic pattern. The orthographic projection of the second incremental pattern 211 on the first conductive pattern layer is still within the pattern of the first conductive pattern layer 10.

As shown in FIG. 10, the second incremental pattern 211 may be a mesh, and the shape of the mesh of the second incremental pattern 211 may be the same as the shape of the portion of the pattern of the first conductive pattern layer 10 without the first incremental pattern 111, i.e., the shape of the mesh of the second incremental pattern 211 may be the same as the mesh of the first basic pattern. The above expression regarding "the same mesh shape" can be understood as that, the shape of each mesh unit in the mesh pattern is the same.

For example, the quantity of sides of the mesh unit, the lengths of the sides of the mesh unit, and the size of the angles of the mesh unit are the same. Thus, the projection of the mesh of the second conductive pattern 21 on the first conductive pattern layer exactly covers the pattern of the first conductive pattern layer, so as not to affect the overall Moire Pattern effect while substantially double the effective width of the channel.

The touch element may further comprise an insulating layer 30. As shown in FIG. 1, the insulating layer 30 is between the first conductive pattern layer 10 and the second conductive pattern layer 20 and is configured to insulate the two conductive pattern layers.

Figure 11:
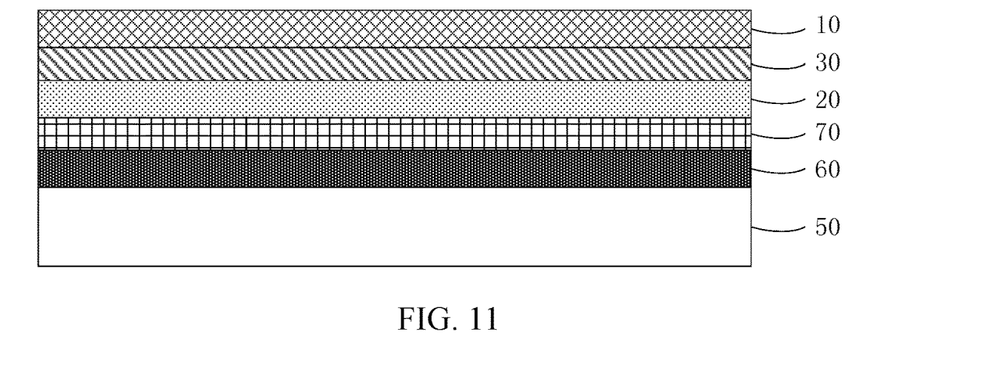
FIG. 11 schematically illustrates a cross-sectional view of a touch substrate in accordance with an embodiment of the present disclosure.

In another aspect of the present disclosure, a touch substrate is provided. FIG. 11 schematically illustrates a cross-sectional view of the structure of the touch substrate according to an embodiment of the present disclosure. The touch substrate comprises a base 50 and a touch element according to one of the embodiments of the present disclosure. The touch element is located on the base 50.

The touch element comprises a first conductive pattern layer 10 and a second conductive pattern layer 20. The first conductive pattern layer 10 comprises a first conductive pattern 11. The first conductive pattern comprises a first basic pattern and a first incremental pattern 111. The second conductive pattern layer 20 is stacked with and insulated from the first conductive pattern layer 10. The orthographic projection of the first incremental pattern 111 on the second conductive pattern layer coincides with the pattern of the second conductive pattern layer 20.

Since the first conductive pattern layer comprises the first conductive pattern having the first incremental pattern and the orthographic projection of the first incremental pattern on the second conductive pattern layer coincides with the pattern of the second conductive pattern layer, the effective width of the channel of the first conductive pattern of the touch substrate is effectively increased without changing the Moire Pattern effect of the touch substrate, thereby increasing the signal transmission speed.

In some embodiments, the touch substrate further comprises a light shielding layer 60 and an overcoat layer 70. The light shielding layer 60, the overcoat layer 70, and the second conductive pattern layer 20 are sequentially disposed in a direction away from the base.

In some embodiments, the touch substrate is applied to a One Glass Solution (OGS) touch screen, so that the advantages of the touch element can be better reflected.

According to yet another aspect of the present disclosure, a display device is provided. The display device comprises the touch substrate in accordance with one of the embodiments of the present disclosure. It should be noted that, the display device of this disclosure may be any product or component having a display function, such as an electronic paper, a mobile phone, a tablet computer, a television, a notebook computer, a digital photo frame, a navigator, and the like.

Figure 12:
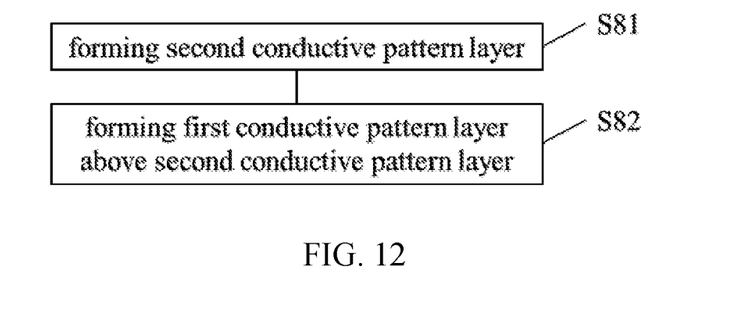
FIG. 12 schematically illustrates a flow chart of a method of manufacturing a touch substrate in accordance with an embodiment of the present disclosure.

According to still another aspect of the present disclosure, a method of manufacturing a touch substrate is provided. FIG. 12 schematically illustrates a flow chart of the method of manufacturing a touch substrate in accordance with an embodiment of the present disclosure. The method of manufacturing a touch substrate comprises:
  step S81: forming a second conductive pattern layer 20, and
  step S82: forming a first conductive pattern layer 10 above the second conductive pattern layer 20.

The first conductive pattern layer comprises the first conductive pattern 11. The first conductive pattern 11 comprises a first basic pattern 11' and a first incremental pattern 111. The orthographic projection of the first incremental pattern 111 on the second conductive pattern layer 20 coincides with the pattern of the second conductive pattern layer 20.

The first conductive pattern of the first conductive pattern layer comprises a first incremental pattern, such that the effective width of the channel of the first conductive pattern is increased. The orthographic projection of the first incremental pattern on the second conductive pattern layer coincides with the pattern of the second conductive pattern layer, so the wiring density of the touch substrate, i.e., the density of the orthographic projection of the wires of the touch substrate on the plane parallel to the base of the touch substrate, is not increased. Therefore, the signal transmission speed is increased without changing the Moire Pattern effect of the touch substrate.

In some embodiments, the step of forming the first conductive pattern layer above the second conductive pattern layer comprises forming the first basic pattern and the first incremental pattern by one patterning process. By using the one patterning process, the involved steps in the manufacturing process can be decreased and the production efficiency can be improved. The expression of "one patterning process" means that the pattern of the conductive pattern layer can be formed by one exposure process, one development process, one etching process, and one stripping process in the one patterning process.

It should be noted that, the conventional patterning process generally comprises processes of photoresist coating, exposure, development, etching, photoresist stripping, etc. However, the techniques of manufacturing a pattern are not limited to this, for example, a lift-off process may be used. In other embodiments, the pattern may be formed without using a mask. For example, the patterning process may be a printing process, or the like. Any process that can be used to form a desired pattern can be referred to as a patterning process.

In some embodiments, the second conductive pattern layer comprises a second conductive pattern. The second conductive pattern comprises a second basic pattern and a second incremental pattern. An orthographic projection of the second incremental pattern on the first conductive pattern layer coincides with the pattern of the first conductive pattern layer. The step of forming the second conductive pattern layer comprises: forming the second basic pattern and the second incremental pattern by one patterning process.

Figure 13:
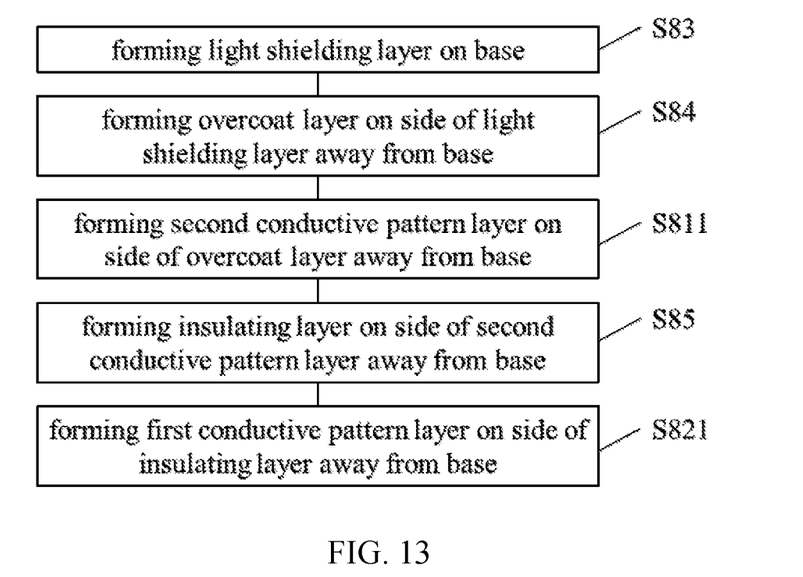
FIG. 13 schematically illustrates a flow chart of a method of manufacturing a touch substrate in accordance with another embodiment of the present disclosure.

FIG. 13 schematically illustrates a flow chart of the method of manufacturing a touch substrate in accordance with another embodiment of the present disclosure. The method comprises:
  step S83: forming a light shielding layer (e.g. a black matrix) on a base, and
  step S84: forming an overcoat layer (OC) on the light shielding layer.

In this case, the step of forming the second conductive pattern layer comprises:
  step S811: forming the second conductive pattern layer on a side of the overcoat layer away from the base.

In some embodiments, the method further comprises:
  step S85: forming an insulating layer on a side of the second conductive pattern layer away from the base.

The insulating layer is configured to electrically insulate the first conductive pattern layer and the second conductive pattern layer. In this case, the step of forming the first conductive pattern layer 10 above the second conductive pattern layer 20 comprises: forming the first conductive pattern layer on a side of the insulating layer away from the base (step S821).

In summary, the present disclosure provides a touch element, a touch substrate, a display device, and a method of manufacturing a touch substrate. The touch element comprises a first conductive pattern layer. The first conductive pattern layer comprises a first conductive pattern. The first conductive pattern comprises a first basic pattern and a first incremental pattern. The touch element further comprises a second conductive pattern layer. The second conductive pattern layer is stacked with and insulated from the first conductive pattern layer. The orthographic projection of the first incremental pattern on the second conductive pattern layer coincides with the pattern of the second conductive pattern layer.

By forming a first incremental pattern in the first conductive pattern of the first conductive pattern layer, the effective width of the channel of the first conductive pattern is increased. Since the orthographic projection of the first incremental pattern on the second conductive pattern layer coincides with the pattern of the second conductive pattern layer, the signal transmission speed may be increased without changing the Moire Pattern effect of the touch element.

It is to be noted that, the term "on" for representing an orientation may mean that one element is directly situated on another element or may mean that there is an intermediate layer between the two elements. Other similar terms representing the locations or the orientation can also be similarly understood. For example, the term "between" can mean that a third element between the first and second elements is the only element between the first and second elements, or that there are other elements in addition to the third element located between the first and second elements. In the specification and the drawings, the same numerals refer to the same elements throughout.

It should be understood by those skilled in the art that the above description is only the specific embodiment of the present disclosure, and is not intended to limit the disclosure. Any modifications, equivalents, and improvements made within the spirits and principles of the present disclosure should be within the scope of the present disclosure.

It will be appreciated that the above embodiments are described by way of example only. Although embodiments have been illustrated and described in detail in the drawings and the foregoing description, such illustration and description are to be considered as illustrative or exemplary and not restrictive, and the present application is not limited to the disclosed embodiments.

Variations to the disclosed embodiments can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality of elements or steps. The terms "first", "second" and similar terms are used for naming purposes only and do not denote a sequence or positional relationship. These terms are interchangeable where appropriate. The embodiments described herein are capable of operation in a sequence other than that described or illustrated herein. The mere fact that certain measures are recited in mutually different dependent claims does not indicate that a combination of these measures cannot be used to advantage.

We claim:

1. A touch element, comprising:
a first conductive pattern layer comprising a first conductive pattern and a first dummy pattern electrically insulated from the first conductive pattern, the first conductive pattern comprises a plurality of first parallel lines, the first dummy pattern comprises a plurality of second parallel lines, and a spacing between any two adjacent ones of the plurality of first parallel lines is half of a spacing between any two adjacent ones of the plurality of second parallel lines, wherein the first conductive pattern comprises a first basic pattern and a first incremental pattern, the first basic pattern comprises a plurality of third parallel lines among the plurality of first parallel lines, the first incremental pattern comprises a plurality of fourth parallel lines among the plurality of first parallel lines, wherein a spacing between any two adjacent ones of the plurality of third parallel lines is the same as a spacing between any two adjacent ones of the plurality of fourth parallel lines; and
a second conductive pattern layer stacked on and insulated from the first conductive pattern layer, wherein the second conductive pattern layer comprises a second conductive pattern, the second conductive pattern comprises a second basic pattern, the second basic pattern comprises a plurality of fifth parallel lines, and the spacing between any two adjacent ones of the plurality of fourth parallel lines is the same as a pacing between any two adjacent ones of the plurality of fifth parallel lines,
wherein a first orthographic projection of the first incremental pattern on the second conductive pattern layer overlaps exactly with the second basic pattern of the second conductive pattern.

2. The touch element of claim 1, wherein an orthographic projection of the first conductive pattern layer without the first incremental pattern on the second conductive pattern layer interlaces with a pattern of the second conductive pattern layer.

3. The touch element of claim 2, wherein a combination comprising the pattern of the second conductive pattern layer and an orthographic projection of the first conductive pattern layer on the second conductive pattern layer is periodically distributed.

4. The touch element of claim 1, wherein the first incremental pattern is a mesh.

5. The touch element of claim 1, wherein the second conductive pattern further comprises a second incremental pattern, and a second orthographic projection of the second incremental pattern on the first conductive pattern layer coincides with a pattern of the first conductive pattern layer.

6. The touch element of claim 5, wherein the second orthographic projection of the second incremental pattern on the first conductive pattern layer overlaps with a portion of the first conductive pattern.

7. The touch element of claim 5, wherein the second incremental pattern is a mesh.

8. The touch element of claim 2, wherein a pattern of the first conductive pattern layer is same as the pattern of the second conductive pattern layer.

9. The touch element of claim 1, wherein the first conductive pattern is configured to be a touch driving electrode, and the second conductive pattern is configured to be a touch sensing electrode.

10. A touch substrate, comprising:
a base, and
the touch element according to claim 1 on the base.

11. The touch substrate of claim 10, further comprising an insulating layer between the first conductive pattern layer and the second conductive pattern layer.

12. The touch substrate of claim 10, further comprising a light shielding layer and an overcoat layer, wherein the light shielding layer, the overcoat layer and the second conductive pattern layer are sequentially stacked in a direction away from the base.

13. A method of manufacturing a touch substrate, comprising:
forming a second conductive pattern layer, and
forming a first conductive pattern layer above the second conductive pattern layer,
wherein the first conductive pattern layer comprises a first conductive pattern and first dummy pattern electrically insulated from the first conductive pattern, the first conductive pattern comprises a plurality of first parallel lines, the first dummy pattern comprises a plurality of second parallel lines, and a spacing between any two adjacent ones of the plurality of first parallel lines is half of a spacing between any two adjacent ones of the plurality of second parallel line,
wherein the first conductive pattern comprises a first basic pattern and a first incremental pattern, the first basic pattern comprises a plurality of third parallel lines among the plurality of first parallel lines, the first incremental pattern comprises a plurality of fourth parallel lines among the plurality of first parallel liens, wherein a spacing between any two adjacent ones of the plurality of third parallel lines is the same as a spacing between any two adjacent ones of the plurality of fourth parallel lines,
wherein the second conductive pattern layer comprises a second conductive pattern, the second conductive pattern comprises a second basic pattern, the second basic pattern comprises a plurality of fifth parallel lines, and the spacing between any two adjacent ones of the plurality of fourth parallel lines is the same as a spacing between any two adjacent ones of the plurality of fifth parallel lines,
wherein a first orthographic projection of the first incremental pattern on the second conductive pattern layer overlaps exactly with a second basic pattern of the second conductive pattern.

14. The method of claim 13, wherein the forming the first conductive pattern layer above the second conductive pattern layer comprises:
forming the first basic pattern and the first incremental pattern by one patterning process.

15. The method of claim 13, wherein the second conductive pattern further comprises a second incremental pattern, and a second orthographic projection of the second incremental pattern on the first conductive pattern layer coincides with a pattern of the first conductive pattern layer,
wherein the forming the second conductive pattern layer comprises:
forming the second basic pattern and the second incremental pattern by one patterning process.

16. The method of claim 13, further comprising:
forming a light shielding layer on a base, and
forming an overcoat layer on the light shielding layer away from the base,
wherein the forming the second conductive pattern layer comprises:
forming the second conductive pattern layer on the overcoat layer away from the base.

17. The method of claim 13, further comprising:
forming an insulating layer on the second conductive pattern layer away from a base,
wherein the forming the first conductive pattern layer above the second conductive pattern layer comprises:
forming the first conductive pattern layer on the insulating layer away from the base.

18. The touch element of claim 1, wherein the second conductive pattern further comprises a second incremental pattern, the second incremental pattern comprises a plurality of six parallel lines, the spacing between any two adjacent ones of the plurality of fifth parallel lines is the same as a spacing between any two adjacent ones of the plurality of six parallel lines.

19. The touch element of claim 18, wherein the spacing between the any two adjacent ones of the plurality of third parallel lines is the same as the spacing between the any two adjacent ones of the plurality of six parallel lines.

* * * * *